US008423863B2

(12) United States Patent
Kim et al.

(10) Patent No.: US 8,423,863 B2
(45) Date of Patent: Apr. 16, 2013

(54) TERMINAL TRANSMISSION APPARATUS FOR PROVIDING MULTIMEDIA SERVICE VIA SATELLITE COMMUNICATION LINK AND METHOD FOR PROVIDING MULTIMEDIA SERVICE USING THE SAME

(75) Inventors: Pan Soo Kim, Daejeon (KR); Dae Ig Chang, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 396 days.

(21) Appl. No.: 12/940,484

(22) Filed: Nov. 5, 2010

(65) Prior Publication Data

US 2011/0113302 A1    May 12, 2011

(30) Foreign Application Priority Data

Nov. 6, 2009  (KR) .................. 10-2009-0107218
Oct. 19, 2010  (KR) .................. 10-2010-0101988

(51) Int. Cl.
*G06F 11/00* (2006.01)

(52) U.S. Cl.
USPC .......................................... 714/755; 714/752

(58) Field of Classification Search ............ 714/755, 714/751, 752, 753, 754, 758
See application file for complete search history.

(56) References Cited

U.S. PATENT DOCUMENTS

| 7,075,981 | B1 | 7/2006 | Clark | |
|---|---|---|---|---|
| 2010/0325512 | A1 | 12/2010 | Yokokawa et al. | |
| 2011/0066911 | A1* | 3/2011 | Yoshimoto et al. | 714/748 |
| 2011/0126072 | A1* | 5/2011 | Yoshimoto et al. | 714/751 |
| 2012/0189079 | A1 | 7/2012 | Taylor et al. | |

FOREIGN PATENT DOCUMENTS

| KR | 10-2009-0045096 A | 5/2009 |
|---|---|---|
| WO | WO-2009/069618 A1 | 6/2009 |

* cited by examiner

*Primary Examiner* — Dieu-Minh Le
(74) *Attorney, Agent, or Firm* — Rabin & Berdo, P.C.

(57) ABSTRACT

The present invention separates inputted triple play IP data into Internet and TV data and voice (VoIP) data, encodes the Internet and TV data permitting a long delay time according to the existing DVB-S2 standard, and encodes the voice data permitting only a short delay time according to a DVB-RCS+M standard based 4K mode. Each encoded data is subjected to the orthogonal modulation and the orthogonally modulated voice data is subjected to a direct sequence spectrum spread according to a spreading factor. The spread spectrum signal is multiplexed in a SCPC frequency division multiple access (FDMA) scheme so as to overlap with frequencies allocated to each user.

12 Claims, 3 Drawing Sheets

TERMINAL TRANSMISSION APPARATUS FOR PROVIDING MULTIMEDIA SERVICE VIA SATELLITE COMMUNICATION LINK AND METHOD FOR PROVIDING MULTIMEDIA SERVICE USING THE SAME

CROSS-REFERENCE TO RELATED APPLICATIONS

This application claims priority under 35 U.S.C. §119 to Korean Patent Applications No. 10-2009-0107218, filed on Nov. 6, 2009, and No. 10-2010-0101988, filed on Oct. 19, 2010, in the Korean Intellectual Property Office, the disclosure of which is incorporated herein by reference in its entirety.

TECHNICAL FIELD

The present invention relates to a terminal transmission apparatus for providing multimedia service via a satellite communication link and a method for providing multimedia service using the same, and more particularly, to a terminal transmission apparatus for providing IP-based satellite broadcasting service, satellite Internet service, and satellite VoIP service via a satellite communication link and a method for providing a multimedia service using the same.

BACKGROUND

Currently, various technologies for providing multimedia service using a satellite communication link have been developed. For example, in Europe, satellite broadcasting service is being provided according to a DVB-S2 (Digital Video Broadcasting-Satellite-2nd Generation) standard and satellite Internet service is provided by a DVB-RCS (Digital Video Broadcasting-Return Channel via Satellite) standard. In addition, satellite IPTV service and satellite VoIP service can be supported by a DVB-RCS standard according to availability of a satellite communication link, a QoS level, performance of a terminal apparatus. It is because the DVB-RCS standard is the technical specification to support the IP-based multimedia service. The DVB-RCS standard initially targeted fixed service, but a mobile service can currently be supported by a DVB-RCS+M standard.

Since the satellite communications can provide service to an area at which terrestrial network signals do not reach, the multimedia service using the satellite communication link may be provided in aircraft, sea, island areas, and mountain areas. However, there are some delay factors of service in the satellite communications due to a long round trip delay and the processing time delay of the low-density parity-check (LDPC) decoding of the DVB-S2 standard.

While the requirements for real-time are relatively low but in the satellite broadcasting and Internet services, delay time is large constraint of service in voice service such as VoIP due to the nature of active interactive service.

In order to overcome these problems, an attempt to reduce the delay factors by making short frame like a 4K frame standard for each user return link has been made in the DVB-RCS+M standard.

SUMMARY

According to the exemplary embodiments of the present invention, there are provided a method for providing voice (VoIP) information through spread spectrum without additionally allocating a new band in a band used for the existing satellite IPTV service and satellite Internet service and a terminal transmission apparatus using the same.

An exemplary embodiment of the present invention provides a terminal transmission apparatus for providing multimedia service, including: a data separator separating input IP data into a first data permitting a delay time equal to or more than a predetermined reference value and a second data permitting the delay time less than a predetermined value; a first encoder performing low-density parity-check (LDPC) encoding on the first data; a first modulator orthogonally modulating an output from the first encoder; a second encoder performing LDPC encoding on the second data; a second modulator quadrature modulating an output from the second encoder; a spreader spreading spectrum on an output from the second modulator with an orthogonal code; and a multiplexer multiplexing an output from the first modulator and an output from the spreader.

The first data may be a satellite Internet service data or a satellite IPTV service data, and the second data may be a satellite VoIP service data.

The second encoder may perform LDPC encoding on the second data so as to have a delay factor smaller than the output from the first encoder, and the first encoder may perform encoding using a DVB-S2 standard and the second encoder may perform encoding using a DVB-RCS+M standard based 4K mode.

The spreader may perform a direct sequence spreading spectrum on the output from the second modulator according to a predetermined spreading factor and the multiplexer may multiplex the signal subjected to the spread spectrum by the spreader in a single-channel per-carrier (SCPC) frequency division multiple access (FDMA) scheme to overlap with frequencies allocated to each user.

Another exemplary embodiment of the present invention provides a method for providing multimedia service, including: separating input IP data into a first data permitting a delay time equal to or more than a predetermined reference value and a second data permitting the delay time less than a predetermined value; first encoding performing low-density parity-check (LDPC) encoding on the first data; first modulating orthogonally modulating an output from the first encoding; second encoding performing LDPC encoding on the second data; second modulating orthogonally modulating an output from the second encoding; spreading spectrum on an output from the second modulating with an orthogonal code; and multiplexing an output from the first modulating and an output from the spreading.

Other features and aspects will be apparent from the following detailed description, the drawings, and the claims.

DETAILED DESCRIPTION OF EMBODIMENTS

Figure 1:
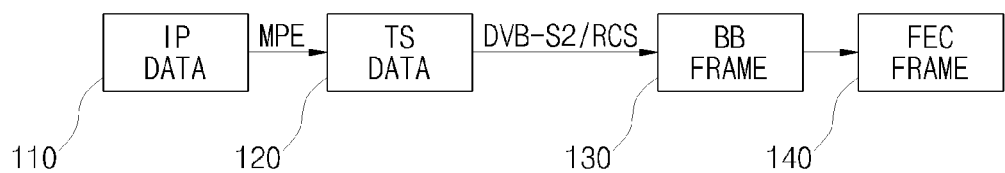
FIG. 1 is a block diagram showing a function of a DVB-S2 system used for data modulation in a terminal transmission apparatus for providing multimedia service according to an exemplary embodiment of the present invention.

Hereinafter, exemplary embodiments will be described in detail with reference to the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

According to the exemplary embodiments of the present invention, it can provide multi-functional multimedia service via a satellite communication link based on a physical layer waveform according to a DVB-RVS+M standard.

Currently, in the DVB-RCS+M standard, a DVB-S2 transmission standard is used in a forward link and a reverse link, and a 4K frame standard is used in a reverse link SCPC (Single Channel Per Carrier) mode. The reason why the 4K frame standard is used is to reduce the processing delay time of a LDPC code. In addition, the DVB-RCS+M standard incorporate a direct sequence spreading spectrum technology.

According to the exemplary embodiments of the present invention, it can provide the VoIP based voice service via the satellite communication link by the spread spectrum in the band used by the existing satellite broadcasting and Internet in addition to the IPTV and satellite Internet services implemented via the DVB-RCS+M standard based Ku/Ka band satellite communication link.

FIG. 1 is a block diagram showing a function of a DVB-S2 system used for data modulation in a terminal transmission apparatus for providing multimedia service according to an exemplary embodiment of the present invention.

As shown in FIG. 1, IP data 110 inputted to a terminal transmission apparatus for providing multimedia service according to the exemplary embodiment of the present invention is converted into Transport Stream (TS) data 120 via a Multi Protocol Encapsulation (MPE) process. The TS data 120 is again converted into a baseband (BB) frame 130 according to the DVB-S2/RCS standard, which is in turn converted into a Forward Error Correction (FEC) frame 140. Or, the IP data 110 can be converted into the BB frame 130 after the Generic Stream Encapsulation (GSE) process.

The Internet service, the IPTV service, and the voice service are modulated in different schemes according to a process identifier (PID) for each service during a process of converting the BB frame 130 into the FEC frame 140. That is, the Internet service and the IPTV service permitting a relatively longer delay time are inputted to an existing DVB-S2 modulator and the voice service permitting only a relatively shorter delay time due to the interactive service is inputted to the DVB-RCS+M standard based 4K mode.

Figure 2:
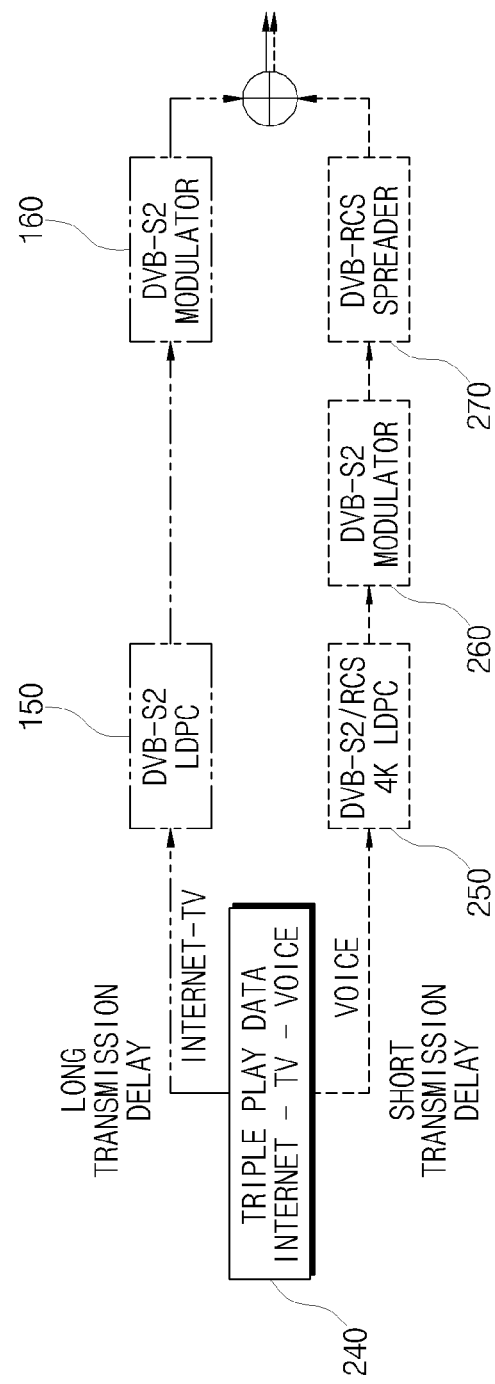
FIG. 2 is a block diagram showing a method for modulating Internet and TV data and voice data in a terminal transmission apparatus for providing multimedia service according to the exemplary embodiment of the present invention.

A process of separating and encoding data is shown in FIG. 2.

As shown in FIG. 2, when the triple play (telecommunications) IP data 240 is inputted, the Internet and the TV data permitting the long delay time are inputted to the existing DVB-S2 LDPC encoder 150 and the voice data permitting short delay time is inputted to the DVB-RCS+M standard based 4K mode LDPC encoder 250. The encoded Internet and TV data and the encoded voice data are relatively subjected to orthogonal modulation by DVB-S2 modulators 160 and 260. The orthogonally modulated voice data is inputted to a DVB-RCS spreader 270, which is then subjected to a spread spectrum according to a spreading factor using an orthogonal code minimizing interference between users.

Describing in more detail, the modulated signal, of which pulse shaping according to the DVB-S2 orthogonal modulation is completed, becomes a signal in a symbol unit via a matching filter, which is subjected to a direct sequence spreading spectrum according to the spreading factor.

Next, the spread spectrum signal is multiplexed to overlap with frequencies allocated to each user by the SCPC (FDMA: frequency division multiple access) scheme.

Figure 3:
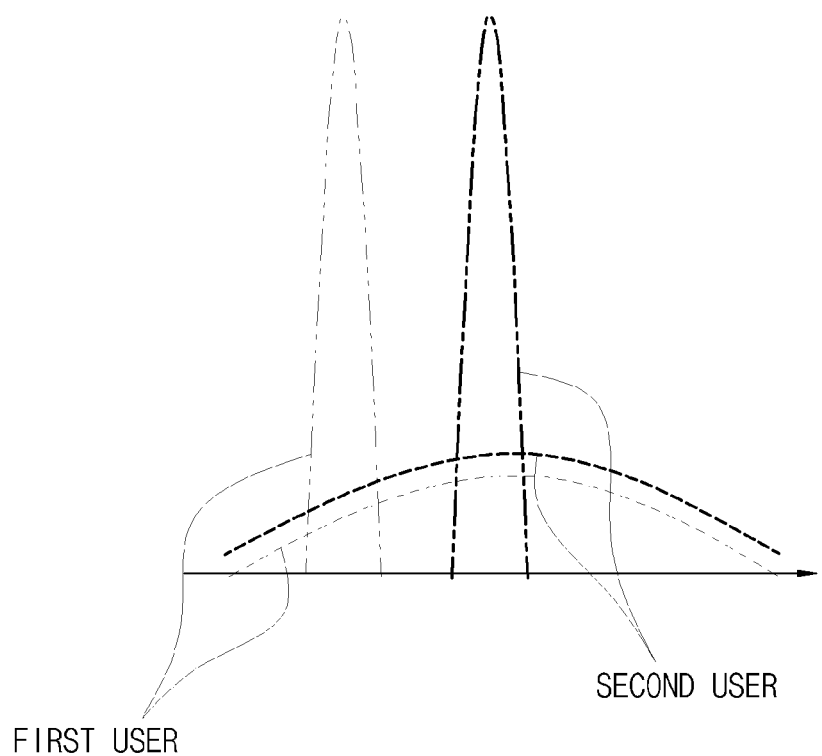
FIG. 3 shows an example of multiplexed signals for each user by a terminal transmission apparatus for providing multimedia service according to the exemplary embodiment of the present invention.

FIG. 3 shows an example of the signal multiplexed to overlap with frequencies allocated to each user.

In FIG. 3, thin lines show signals provided to a first user, thick lines show signals provided to a second user, dash-dot-dotted lines show Internet and TV data signals, and dotted lines show voice signals.

In other words, as shown in FIG. 3, the frequency efficiency can be increased while using the existing frequency band without allocating a new band. In this case, however, the inter-user interference may occur. As a method for minimizing the interference, a method of making the spreading factor large and allowing a user to perform an interference mitigation signal processing technology at a receiver, etc., may be considered. In addition, since the spread spectrum signal is a voice service signal, of which the QoS level is low, the required QoS level can be easily achieved.

According to the exemplary embodiments of the present invention, it can transmit the voice information through the existing frequency band used for the existing satellite IPTV service and the satellite Internet service without allocating an additional band, thereby making it possible to provide triple play service while increasing frequency efficiency.

Further, according to the exemplary embodiments of the present invention, it can provides service through the spread spectrum for the voice service signals, thereby making it possible to provide service meeting the desired QoS level while increasing the frequency efficiency.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal transmission apparatus for providing multimedia service, comprising:
    a data separator separating input IP data into a first data permitting a delay equal to or more than a predetermined reference value and a second data permitting the delay time less than a predetermined value;
    a first encoder performing low-density parity-check (LDPC) encoding on the first data;
    a first modulator orthogonally modulating an output from the first encoder;
    a second encoder performing LDPC encoding on the second data;
    a second modulator orthogonally modulating an output from the second encoder;
    a spreader spreading spectrum on an output from the second modulator with an orthogonal code; and
    a multiplexer multiplexing an output from the first modulator and an output from the spreader.

2. The apparatus of claim 1, wherein the first data is a satellite Internet service data or a satellite IPTV service data; and the second data is a satellite VoIP service data.

3. The apparatus of claim 1, wherein the second encoder performs LDPC encoding on the second data so as to have a delay factor smaller than the output from the first encoder.

4. The apparatus of claim 1, wherein the first encoder performs encoding using a DVB-S2 standard and the second encoder performs encoding using a DVB-RCS+M standard based 4K mode.

5. The apparatus of claim 1, wherein the spreader performs a direct sequence spreading spectrum on the output from the second modulator according to a predetermined spreading factor.

6. The apparatus of claim 1, wherein the multiplexer multiplexes the signal subjected to the spread spectrum by the spreader in a single-channel per-carrier (SCPC) frequency division multiple access (FDMA) scheme to overlap with frequencies allocated to each user.

7. A method for providing multimedia service, comprising:
separating input IP data into a first data permitting a delay time equal to or more than a predetermined reference value and a second data permitting the delay time less than a predetermined value;
first encoding performing low-density parity-check (LDPC) encoding on the first data;
first modulating orthogonally modulating an output from the first encoding;
second encoding performing LDPC encoding on the second data;
second modulating quadrature modulating an output from the second encoding;
spreading spectrum on an output from the second modulating with an orthogonal code; and
multiplexing an output from the first modulating and an output from the spreading.

8. The method of claim 7, wherein the first data is a satellite Internet service data or a satellite IPTV service data; and
the second data is a satellite VoIP service data.

9. The method of claim 7, wherein the second encoding performs LDPC encoding on the second data so as to have a delay factor smaller than the output from the first encoding.

10. The method of claim 7, wherein the first encoding performs encoding using a DVB-S2 standard and the second encoding performs encoding using a DVB-RCS+M standard based 4K mode.

11. The method of claim 7, wherein the spreading performs a direct sequence spreading spectrum on the output from the second modulating according to a predetermined spreading factor.

12. The method of claim 7, wherein the multiplexing multiplexes the signal subjected to the spread spectrum by the spreading in a single-channel per-carrier (SCPC) frequency division multiple access (FDMA) scheme to overlap with frequencies allocated to each user.

* * * * *